United States Patent

[11] 3,631,484

| [72] | Inventor | Harry A. Augenblick<br>Mountain Lakes, N.J. |
|---|---|---|
| [21] | Appl. No. | 845,955 |
| [22] | Filed | July 30, 1969 |
| [45] | Patented | Dec. 28, 1971 |
| [73] | Assignee | Microlab/FXR<br>Livingston, N.J. |

[54] HARMONIC DETECTION SYSTEM
9 Claims, 6 Drawing Figs.

[52] U.S. Cl. ................................................ 343/6.5 R,
343/8, 343/14, 343/18 D
[51] Int. Cl. .................................................. G01s 9/56
[50] Field of Search .......................................... 343/6.5 R,
6.5 SS, 14, 18 D

[56] References Cited
UNITED STATES PATENTS

| 2,528,119 | 10/1950 | Crosby ........................ | 343/14 |
| 3,067,417 | 12/1962 | Harding ........................ | 343/6.5 X |
| 3,098,973 | 7/1963 | Wickersham et al. ........ | 343/6.5 X |
| 3,108,275 | 10/1963 | Chisholm ..................... | 343/6.5 X |
| 3,182,315 | 5/1965 | Sweeney ...................... | 343/6.5 |
| 3,308,464 | 3/1967 | Lewis ........................... | 343/6.5 X |
| 3,384,892 | 5/1968 | Postman ....................... | 343/6.5 |
| 3,447,154 | 5/1969 | Schrader ...................... | 343/6.5 |

Primary Examiner—T. H. Tubbesing
Attorney—Irving Seidman

ABSTRACT: A detection system comprising a transmitter for radiating signal of frequency "F" to a harmonic generator. The generator is adapted to produce a signal of frequency "XF+XD" where XF is a harmonic of the transmitted signal and XD is a frequency shift due to the movement of the generator. A receiver includes a multiplier connected to the transmitter for producing a signal XF and a mixer adapted to receive the harmonic generator signal and the multiplier signal for producing a signal proportional to the difference therebetween.

INVENTOR
HARRY A. AUGENBLICK
BY
Irving Seidman
ATTORNEY

INVENTOR
HARRY A. AUGENBLICK

HARMONIC DETECTION SYSTEM

BACKGROUND OF THE INVENTION

1. Field of the Invention

This invention relates to a detection and navigation system for detecting the movement of elements having nonlinear electrical characteristics which cause harmonics of a transmitted signal to be generated, and to interrogate said elements for information by the application of electrical bias modulation thereto. The invention has particular application in theft control systems and the like.

2. Description of the Prior Art

Harmonic generators make use of the nonlinear properties of active elements such as tubes, transistors and the like to produce harmonics of the signal of fundamental frequency applied to the particular device. Only harmonic generators are capable of generating such harmonics. The fundamental frequency may be applied to and the harmonics may be transmitted by nonlinear elements or devices by means of physical conductors such as waveguides, coaxial cables, or wires. Alternatively, the fundamental frequency signal may be radiated to and the harmonic signal may be reradiated from such nonlinear elements or devices without physical conductors. However, a serious problem has been encountered in attempting to filter and shield such devices.

More particularly, the transmitter circuitry usually creates harmonic signals which are transmitted along with the signal of fundamental frequency. Hence, the harmonic signal generated by the transmitter may completely mask the signals generated by the nonlinear element so that the system continuously produces erroneous indications of the presence or movement of the harmonic-generating nonlinear device. To compound the problem even further, if the harmonic signal radiated by the nonlinear device has a low amplitude, it may be lost in the random signals received by and/or generated within the receiver.

The above problems may be eliminated by utilizing proper shielding and RF filtering in the transmitter and receiver. However, the filters, of necessity, would have to have extremely sharp and thus have steep stop band characteristics in order to make the transmitter and receiver sensitive to the harmonic signals generated by the nonlinear elements. Accordingly, a small frequency drift of the transmitted frequency may very well cause the received harmonic signal to fall outside of the passbands of the receiver filters. Thus, this information signal would be attenuated and again the system would produce erroneous results.

Furthermore, a deliberate large frequency shift of the transmitted frequency may be desired in certain applications. Such large frequency shifts may well extend beyond the passbands of such receiver filters. Hence, such filters cannot be utilized in devices of the type under consideration.

Accordingly, an object of the present invention is to provide a detection and navigation system for detecting the movement of a target device which utilizes energy radiated from a harmonic generator and which is insensitive to frequency drift.

Another object of the present invention resides in the novel details of the circuitry which eliminate the narrow-band RF filters normally required by conventional harmonic detection systems.

Another object of the present invention is to detect and interrogate harmonic targets over a wide range of fundamental frequencies.

A detection system constructed according to the present invention comprises a transmitter including signal-generating means for generating a preselected frequency signal and radiating means for radiating the signal to a harmonic generator means which is operable to generate an output signal having a frequency equal to the frequency of a harmonic of said preselected frequency plus a differential proportional to the speed of said harmonic generator means. A receiving means is provided for detecting the movement of said harmonic generator means. The receiving means comprises an antenna for receiving the output signal, multiplier means connected to the signal-generating means for producing a signal of frequency equal to said harmonic, and mixing means connected to the antenna and the multiplier means for producing a signal proportional to the difference in frequency between said output and harmonic signals.

Other features and advantages of the present invention will become more apparent from the consideration of the following detailed description when taken in conjunction with the accompanying drawings, in which:

FIG. 1 is a block diagram of a system utilizing the apparatus of the present invention, in which the presence of a moving target device may be detected;

FIGS. 2a and 2b diagrammatically illustrate antennas which may be used in conjunction with the system shown in FIG. 1;

FIG. 3 illustrates a schematic diagram of the circuit of a harmonic generator incorporating a preselected amount of time delay; and FIGS. 4 and 5 illustrate, in block diagram form, devices which may be incorporated into the system of FIG. 1 to increase the efficiency thereof.

DESCRIPTION OF THE PREFERRED EMBODIMENTS

As noted hereinabove, the present invention includes an electrical element having a nonlinear characteristic curve. While a number of elements have this property, the present invention will be described in conjunction with a semiconducting diode. However, this is not to be interpreted as being a limitation on the present invention since any device which generates signals from a signal of fundamental frequency may be utilized. Additionally, certain specific frequencies of operation will be specified hereinbelow. However, it is again emphasized that these ranges of frequencies are for illustrative purposes only and the invention is not to be interpreted as being limited to operation in these particular ranges.

Figure 1:
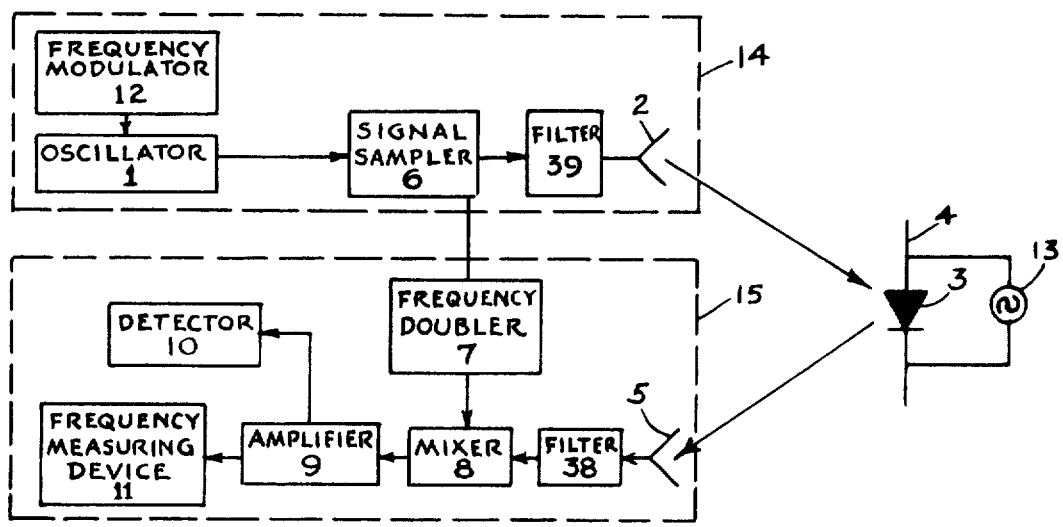

Referring to the drawings, FIG. 1 illustrates a system constructed in accordance with the present invention, which system includes a transmitting unit designated generally by the reference numeral 14. More specifically, the transmitting unit 14 includes an oscillator 1 which generates electromagnetic signals of frequency F. These signals are applied to a series chain comprising a signal sampler 6 of known construction and a filter 39 and are transmitted from an antenna 2 which is connected to the filter 39.

A harmonic generator, such as a semiconductor diode 3, which has nonlinear electrical characteristics, is positioned in the path of signals radiated from the antenna 2. Although a diode has been disclosed as the harmonic generator, it is to be noted that this is by way of illustration and is not to be interpreted as being a limitation of the present invention. That is, any device having nonlinear electrical characteristics which will produce signals which are harmonics of the fundamental F may be utilized.

Accordingly, as shown in FIG. 1, electrical conductors 4 are connected to the respective cathode and anode terminals of the diode 3 and provide antennas which receive energy from the radiated signals, apply the same to the diode 3, and reradiate the same back to a receiving unit 15. The conductors 4 may be made integral with the diode 3.

As noted above, because of the inherent nonlinear characteristics of the diode 3, the output signal produced by the diode will be a distorted waveform of the input signal of fundamental frequency F. Accordingly, the output signal will contain a number of the harmonics of the input signal. For example, the second harmonic output signal of the diode 3 will have a frequency 2F.

A receiving unit 15 is provided which includes a receiving antenna 5 which is connected to a series chain comprising a filter 38, a mixer 8, an amplifier 9 and a frequency-measuring device 11. In view of the fact that the second harmonic of the fundamental F is used in the illustrative embodiment of the present invention, a frequency doubler 7 is connected between the signal sampler 6 and the mixer 8. The frequency doubler 7 is adopted to produce a signal having a frequency which is double that of the fundamental F or 2F and to apply the same to the mixer 8. However, if a harmonic other than the second harmonic is utilized, an appropriate frequency multiplier will be used instead of the frequency doubler 7. For example, if the third harmonic of the fundamental is detected by the receiver, a frequency tripler will be connected between the sampler 6 and the mixer 8.

Additionally a detector 10 is connected to the output of the amplifier 9.

If the harmonic generator or diode 3 is moving with respect to the receiver 15, the signal transmitted by the diode will be shifted in frequency due to the well-known Doppler shift or effect. That is, if the diode is approaching the receiver 15, the frequency of the signal transmitted from the diode 3 will be F+D, where D is due to the Doppler shift. On the other hand, if the generator 3 is moving away from the receiver with the same velocity, it will produce a fundamental of frequency F−D. Assuming, for illustrative purposes, the generator 3 is approaching the receiver, the second harmonic will have a frequency of 2(F+D) or 2F+2D.

The filter 39 is tuned to the fundamental F and the filter 38 is tuned to the second harmonic 2F. Both filters have relatively wide passbands so that signals in the vicinity of the respective signals F and 2F will not be attenuated.

The mixer 8 mixes the doubled signal 2F with the received signal 2F+2D and produces a signal equal to the difference between the two signals or 2D, in the conventional manner. This signal of frequency 2D is related to the speed of said moving diode 3 and which difference frequency is applied to amplifier 9. The output signal 2D from the amplifier 9 can be applied to detector 10, which detector can be calibrated to measure the presence of a moving harmonic generator. The output signal 2D from the amplifier 9 can further be applied to a frequency measuring device 11. Such device can be calibrated to measure the speed of the said diode. (As used herein, the term "speed" means velocity or rate of motion.)

The system of FIg. 1 can further be used to measure distance to the diode or generator target 3, whereby it is also possible to limit, to any predetermined value, the distance at which the target can be detected. The output of oscillator 1 can be modulated by frequency modulator 12 to cause the frequency of said output to vary linearly with time. The frequency of the output signal from antenna 5 will thus also vary linearly with time, but the instantaneous frequency output of said antenna 5 will be delayed with respect to the signal from frequency doubler 7 as a function of the path length from antenna 2 to diode 3 and from diode 3 to antenna 5. As a result the output frequency of mixer 8 and thus the input frequency to the frequency-measuring device 11, will be a function of said path lengths. Accordingly, the frequency-measuring device 11 can be calibrated to indicate the distance to said fixed target. By incorporating filter means in said frequency-measuring device, it is possible to select only those signals which correspond to a particular distance or range of distances to said target. It is to be noted that in applying the system of FIG. 1 to distance-measuring applications, the receiver and transmitter may be operating simultaneously without interfering with or distorting the signal being received from the diode target. It is also noted that no pulsing circuits or T/R devices are required as in conventional radar distance-measuring systems wherein the transmitter has to be turned off prior to turning on the receiver. This, in turn, permits measurements down to zero distance.

The application of a small amount of voltage bias 13 to diode 3 will affect the point of operation of the diode 3 and therefore will affect the impedance of the diode in such a way as to change the current flow through the diode and change all harmonic contents. If this bias is changed periodically, the harmonic signal radiated will be amplitude modulated in accordance with the change in bias. As is well known, amplitude modulation causes a shift of the modulated frequency equal to the modulating frequency. The frequency of modulating voltage bias 13 applied to diode 3 can be measured by frequency-measuring device 11. Accordingly, the detection and navigation system of the present invention may be utilized for the interrogation of fixed or variable information at the diode by the application of an electrical bias which varies as a function of time. Thus, a particular harmonic generator or diode 3 could be identified through its individual modulation characteristics. Moreover, the harmonic generator can be employed as a transponder or device that, when interrogated, and only when interrogated, transmits information that is modulated onto the harmonic signal generated by the diode.

While the circuit shown and described in FIG. 1 employs frequency doubler 7 to generate reference signal 2F, it should be noted that the natural harmonic content of oscillator 1 may well be sufficient to provide such reference signal 2F without additional circuitry.

It is further noted that mixer 8 is also a potential harmonic generator and is capable of multiplying the output signal F from signal sampler 6 to the required reference signal 2F and simultaneously mixing such 2F with the output of antenna 5, thereby eliminating the need for frequency doubler 7.

The signal of fundamental frequency radiated by the transmitter antenna 2 must be detected by the nonlinear element 3 with reasonable efficiency and the second harmonic generated within the element must be reradiated with similar efficiency. The conducting leads 4 which are usually a part of the elements can form a receiving and transmitting dipole and antenna provided their dimensions approximate those of an ideal dipole antenna at the particular frequencies under consideration.

The selection of antennas depends on the size and range of the area to be surveyed. Systems sensitivity and range will, of course, be highest when high-directivity and high-gain antennas which survey only a small sector of an area at any one time are used. To avoid the possibility of cross-polarization of the antenna fields and element dipole, which can occur with linearly polarized antennas and which would prevent pickup of the fundamental by the element dipole, circularly polarized transmitting and receiving antennas may be used.

The greater the gain of the antenna associated with an individual diode 3, the greater the gain or range of the diode communication system. This gain means that the voltage induced across the diode 3 may be increased by using antennas that intercept more energy in space or do so in a particular direction. Almost every known antenna system could be employed for this purpose. For example, the diode 3 may be mounted at the center of a dipole, rhombic, biconical, discone or similar antenna. Additionally, the diode 3 may be mounted at the junction of an image dipole, conical or similar antenna and the ground plane. Other possibilities are to mount the diode at the end of a long wire antenna or to mount the diode at the focus of a parabolic or corner reflector antenna. Two or more diode antennas may be arranged into a phased array wherein a high-gain narrow beam of this antenna system is increased in proportion to the number of dipole antennas so connected.

Figure 2A:
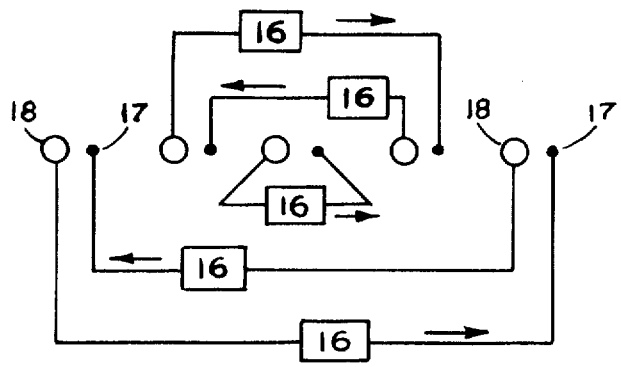

As is well known in the art, a plane wave which strikes a phased array at an angle with respect to a normal to the plane of the array will leave the array at the same angle (i.e., the angle of incidence is equal to the angle of reflection). If the received energy is caused to flow in a single direction through the use of isolators, filters, amplifiers 16 and the like, as shown in FIG. 2A, and if the energy so flowing is caused to be reradiated, and the reradiating antennas 17 are reversed in position from the receiving antennas 18 and these equal angles are employed, then the energy so received will be radiated back in the exact direction from which it originated. Thus, energy received from the transmitting unit will be directed back to the receiving unit which is located at the same point in space as the transmitting unit. It will be appreciated that by proper positioning of the receiving and reradiating antennas, the high-gain beam which is narrow along its longitudinal axis can, at the same time, be made narrow along an axis transverse to said longitudinal axis, thereby extending to said beam a pencillike shape.

Figure 2B:
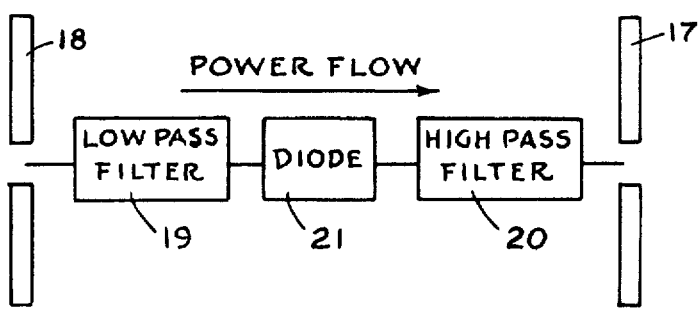

The above principle may be directly applied to an array of diode antennas, as shown in FIG. 2B, in which the unidirectional power flow is assured through the use of filters 19 and 20 and diode 21 so polarized so that the harmonic beam retransmitted from this array will return in the exact direction from which the signal of fundamental frequency arrived.

The efficiency and range of the proposed diode detection and navigation systems are functions of the transmitter power and the amount of a given harmonic that can be generated for a given amount of received fundamental signals. Any particular harmonic may be optimized by the use of filters, phased lines, and the like.

Figure 3:
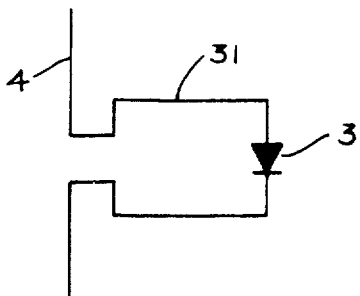

While a diode has an intrinsic time delay, under certain conditions it may be desirable to insert a delay line 31 between the antenna 4 and the diode 3, as shown in FIG. 3. If the transmitted energy is confined to an area of reasonable size, and if the diodes have the equivalent of approximately 1 mile of time delay, such a diode can be readily distinguished from diodes having other time delays or not having any time delay.

Figure 4:
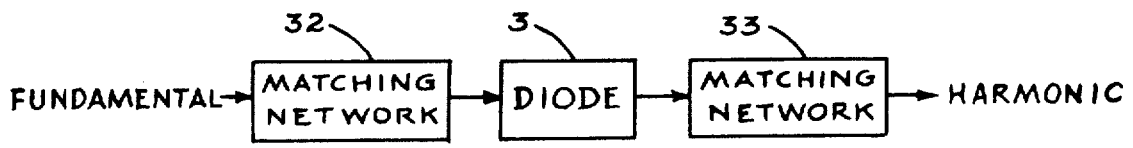

The efficiency of the detection and navigation system of the present invention will be decreased if there is an impedance mismatch at the input and output of the diode. Accordingly, as shown in FIG. 4, the impedance mismatch may be eliminated by utilizing impedance-matching networks 32 and 33 which are respectively connected to the input and output of the diode harmonic generator 3. It is to be noted that the impedance of the diode is a function of the input power level. Thus, impedance-matching networks may be utilized so as to maximize the harmonic at the minimum anticipated power level without materially reducing performance at higher power levels.

Figure 5:
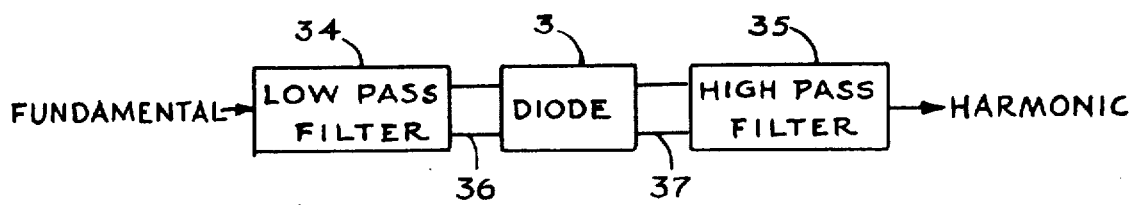

With reference to the schematic drawing of FIG. 5, low-pass and high-pass filters 34 and 35, respectively, and line stretchers 36, 37 are arranged so that the following results are obtained. Harmonics generated by the diode 3 pass through the high-pass filter 35 unattenuated. Harmonics generated by the diode 3 which pass to the left, as taken in FIG. 5, are reflected by low-pass filter 34 back to the diode 3. On the other hand, the fundamental signal passes through the low-pass filter inimpeded but is reflected by the high-pass filter 35. Lines 36 and 37 are of such length so as to cause the reflected harmonic and fundamental signals to arrive at the diode or harmonic generator 3 so that they reinforce signals having the same frequency.

Additionally, simple idler circuits, such as shorted stubs or the like can be added to the circuit of FIG. 5 so as to reflect any higher harmonics with appreciative power content back to the diode for conversion and mixing back into the desired harmonic.

The range of the present detection system can be increased by incorporating amplifiers between the diode and the diode antenna on both the input and output sides of the diode.

The apparatus of the present invention may be utilized in connection with theft control systems for identifying merchandise that is being removed without authorization. Referring to FIG. 1, merchandise would require diodes 3 and diode antennas 4. Exits and other locations that might provide pathways for stolen merchandise would require transmitting and receiving units, 14 and 15. The transmitting unit 14 would radiate the merchandise containing diode 3, which diode would generate harmonic signals, which signals would be received by the receiving unit or receiver 15. As the diode 3 would have to be moved with respect to the transmitting and receiving units in order to be stolen, such motion would cause a Doppler shift of the received harmonic signal which would be detected by detector 10. Detector 10 may be connected to an alarm device (not shown), which device would be activated by the moving diode 3.

In search and rescue operations, the search vehicle would contain the transmitting and receiving units, 14 and 15. The person or object that may require rescue is equipped with diode 3. The search vehicle would move with respect to the person or object to be retrieved. When the transmitting and receiving units were moved within range of diode 3, the Doppler shift of the harmonic signal would reveal the presence of diode 3, enabling the rescue.

In addition to the above applications the range and bearing measurement capability of the present invention can provide navigational assistance. Markers or obstacles would be equipped with diode 3. A vehicle would be equipped with transmitting and receiving units 14 and 15. Antennas 2 and 5 would have high gain and be highly directional. The bearing of the marker or obstacle would be determined by rotating antennas 2 and 5 until detector 10 indicated maximum signal. The position of antennas 2 and 5 would then determine the bearing of diode 3. Frequency modulator 12 would be employed in this instance to permit frequency-measuring device to measure the range of diode 3 and thus the range of the marker or obstacle to which such diode was attached. Modulation bias 13 could be applied to diode 3 to provide an identifying signature of said diode.

The transmitting and receiving units, 14 and 15, may be employed to detect the presence of electronic equipment. Such equipment contains diodes and other semiconductors that can take the place of diode 3. As such equipment is generally shielded, and as such shielding prevents most frequencies from penetrating to the internal semiconductors, an optimum interrogation frequency must be selected. The circuit of FIG. 1 can be designed so as to detect diodes over a very broad band of frequencies as the only limitation on such frequency variation is that imposed by filter 38, which filter must reject the fundamental signal F. Even greater flexibility is realized by switching or otherwise tuning filters 38 and 39. The frequency of oscillator 1 would be varied over a wide range through the use of frequency modulator 12, permitting a wide choice of interrogation frequencies, thereby increasing the probability of detection of the presence of electronic equipment.

While specific embodiments of the invention have been shown and described in detail to illustrate the application of the principles of the invention, it will be readily understood and appreciated that various changes or modifications thereof may be made without departing from the spirit or scope of the invention.

What is claimed is:

1. A detection system comprising a transmitter including signal-generating means for generating a signal having a preselected frequency, and radiating means connected to said signal-generating means for radiating said signal of preselected frequency, a passive harmonic generator means operable to receive said preselected frequency signal for generating an output signal having a frequency equal to a harmonic greater than said preselected frequency plus a differential proportional to the speed of said harmonic generator means; and receiving means for detecting the movement of said harmonic generator means; said receiving means comprising an antenna for receiving said output signal, multiplier means connected to said signal-generating means for producing a signal of frequency equal to said harmonic, and mixing means connected to said antenna and said multiplier means for producing a signal proportional to the difference in frequency between said output and harmonic signals.

2. In a detection system as in claim 1, and frequency-modulating means connected to said signal-generating means to vary the frequency of the signal produced by said signal-generating means about said preselected frequency.

3. In a detection system according to claim 1, in which said harmonic-generating means comprises a diode connected to an antenna.

4. In a detection system as in claim 3, and biasing means to operate said diode at a predetermined point on its characteristic curve to change the impedance thereof.

5. In a detection system as in claim 4, in which said biasing means comprises a source of varying potential to modulate the signals generated by said diode.

6. In a detection system according to claim 1, in which said harmonic-generating means comprises a diode connected between a receiving and transmitting antenna.

7. In a detection and navigation system as in claim 1, and a filter connected to said harmonic-generating means for attenuating all signals except a preselected one of said harmonic signals.

8. In a detection system as in claim 1, and indicating means responsive to said mixing means signal for indicating the movement of said harmonic generator means.

9. In a detection system as in claim 3, and frequency-detecting means responsive to said mixing means signal for producing an indication proportional to the frequency of said mixing means.

* * * * *